(12) United States Patent
Hirato

(10) Patent No.: US 7,667,816 B2
(45) Date of Patent: Feb. 23, 2010

(54) LIQUID CRYSTAL DROP FILL DEVICE AND A METHOD FOR DROP FILLING LIQUID CRYSTAL BY THE USE OF THE DEVICE

(75) Inventor: Shinichi Hirato, Tsu (JP)

(73) Assignee: Sharp Kabuhsiki Kaisha, Osaka (JP)

( * ) Notice: Subject to any disclaimer, the term of this patent is extended or adjusted under 35 U.S.C. 154(b) by 0 days.

(21) Appl. No.: 11/996,490

(22) PCT Filed: Jun. 27, 2006

(86) PCT No.: PCT/JP2006/312778

§ 371 (c)(1),
(2), (4) Date: Sep. 30, 2008

(87) PCT Pub. No.: WO2007/010714

PCT Pub. Date: Jan. 25, 2007

(65) Prior Publication Data
US 2009/0122252 A1      May 14, 2009

(30) Foreign Application Priority Data
Jul. 19, 2005   (JP)  .............................. 2005-208020

(51) Int. Cl.
*G02F 1/1341*    (2006.01)
(52) U.S. Cl. .................. 349/189; 349/187; 349/191
(58) Field of Classification Search ............... 349/187, 349/189, 191
See application file for complete search history.

(56) References Cited

U.S. PATENT DOCUMENTS

| 6,734,943 B2 * | 5/2004 | Noiri ........................... 349/153 |
| 7,111,755 B2 | 9/2006 | Koyama et al. |
| 2004/0090591 A1 | 5/2004 | Jung |
| 2007/0002258 A1 * | 1/2007 | Wu ............................. 349/155 |

FOREIGN PATENT DOCUMENTS

| JP | 2002-258299 A | 9/2002 |
| JP | 2004-163952 A | 6/2004 |
| JP | 2005-134464 A | 5/2005 |

* cited by examiner

*Primary Examiner*—Jennifer Doan
(74) *Attorney, Agent, or Firm*—Birch, Stewart, Kolasch & Birch, LLP

(57) ABSTRACT

A liquid crystal drop fill device by which liquid crystal panels of different sizes is easily obtained from a mother glass, and a method for drop filling liquid crystal by using the device is provided in order to increase utilization efficiency of the mother glass. The device 1 includes a stage 3 arranged to support a substrate 2, liquid crystal dispensers 4 and 5 arranged to drop fill liquid crystal on the substrate 2, a first moving unit 6 arranged to support the dispensers 4 and 5 movably in a Y-direction relative to the stage 3, and second moving units 7 and 8 arranged to support the dispensers 4 and 5 movably in an X-direction relative to the first moving unit 6, wherein the device 1 further includes a third moving unit 9 arranged to support the dispenser 5 to be further movable in the Y-direction relative to the second moving unit 8.

4 Claims, 4 Drawing Sheets

LIQUID CRYSTAL DROP FILL DEVICE AND A METHOD FOR DROP FILLING LIQUID CRYSTAL BY THE USE OF THE DEVICE

BACKGROUND OF THE INVENTION

1. Field of the Invention

The present invention relates to a crystal liquid drop fill device which is preferably used for manufacturing a liquid crystal panel, and a method for drop filling liquid crystal by the use of the device.

2. Description of the Related Art

In recent years, a liquid crystal display device including a liquid crystal panel is widely used as a flat-screen display device. The liquid crystal panel includes liquid crystal which is sealed in between two glass substrates having electrodes, and a voltage is applied to the liquid crystal so as to display an image. The liquid crystal panel is manufactured by bonding the two glass substrates via a sealing agent which is applied to either of the glass substrates so as to surround a display region having the shape of a rectangle, and the space formed by the two bonded glass substrates and the sealing agent are sealed with the liquid crystal. The liquid crystal is drop filled in the display region surrounded by the sealing agent on the glass substrate by a liquid crystal drop fill device before the two glass substrates are bonded.

Generally, in manufacturing this kind of liquid crystal panel, a plurality of liquid crystal panels are manufactured from one huge mother glass (a large-size glass substrate from which a plurality of liquid panels are to be obtained), and up to the midway of the manufacture of the liquid crystal panels, arrangements for the manufacture such as forming a plurality of wiring patterns for the liquid crystal panels are made while the liquid crystal panels are left on the mother glass. Drop filling of the liquid crystal which is described above is also performed while the liquid crystal panels are left on the mother glass.

FIG. 3 is a view showing a schematic configuration of a conventional liquid crystal drop fill device. As illustrated, a liquid crystal drop fill device 20 includes a stage 3 which is arranged to support a glass substrate 2, a first liquid crystal dispenser 4 and a second liquid crystal dispenser 5 which are arranged to drop fill liquid crystal on the glass substrate 2 supported by the stage 3, a first moving unit 6 which is arranged to support the first liquid crystal dispenser 4 and the second liquid crystal dispenser 5 so as to be movable in a Y-direction (a moving direction of the liquid crystal dispensers 4 and 5 when dispensing the liquid crystal), second moving units 7 and 8 which are arranged to respectively support the first liquid crystal dispensers 4 and 5 so as to be movable independently in an X-direction (the direction perpendicular to the moving direction of the liquid crystal dispensers 4 and 5 when dispensing the liquid crystal), and a control system (not shown) which controls operations of these constituent members. On the glass substrate 2, regions 21 and 22 of a size in which the liquid crystal is to be drop filled are prepared by being surrounded by a sealing agent 2a.

The liquid crystal in the shape of a water droplet is drop filled on the glass substrate 2. The first liquid crystal dispenser 4 and the second liquid crystal dispenser 5 dispense the liquid crystal at established time intervals, so that the drops of the liquid crystal dispensed on the glass substrate 2 are arranged at regular intervals in the X-direction and Y-direction. In the liquid crystal drop fill device 20, the glass substrate 2 is secured to the stage 3, and the first liquid crystal dispenser 4 and the second liquid crystal dispenser 5 are arranged to be moved in the X-direction and Y-direction so as to dispense the liquid crystal at established intervals.

FIG. 4 is a view showing a pattern of the liquid crystal to be dispensed in the liquid crystal drop filled regions 21 and 22. As illustrated, fifty-five positions starting from a position C1 to a position C55 at which the liquid crystal is to be dispensed are arranged at regular intervals. The position C1 indicates the first position, and the position C55 indicates the last position. The first liquid crystal dispenser 4 and the second liquid crystal dispenser 5 are moved in relation to each other in sequence in the directions of the arrows in FIG. 4 from the position C1 relative to the glass substrate 2, and dispense a predetermined amount of the liquid crystal at each of the positions in the liquid crystal drop filled regions 21 and 22. As a prior art literature relating to the present invention, Japanese Patent Application Unexamined Publication No. 2004-90621 is cited, which discloses fixed-nozzles in a plurality of rows placed in parallel, from which liquid is discharged.

In recent years, accompanied by increases in the size of a screen for a liquid crystal display device used in a liquid crystal television set, the size of a liquid crystal panel is increased in variety, so that there is a problem concerning utilization efficiency of a mother glass. For example, if a mother glass of a size such that two liquid crystal panels of a size A can be obtained therefrom leaving the small remainder which is a portion not used for the liquid crystal panels is used to obtain two liquid crystal panels of a size B smaller than the size A, the larger remainder is undesirably left, or if the mother glass is used to obtain a liquid crystal panel of a size C larger than the size A, one liquid crystal panel is only obtained and the still larger remainder is left undesirably.

SUMMARY OF THE INVENTION

In order to overcome the problems described above, preferred embodiments of the present invention provide a liquid crystal drop fill device by which a plurality of liquid crystal panels of different sizes can be easily obtained from a mother glass, and a method for drop filling liquid crystal by the use of the device in order to increase utilization efficiency of the mother glass.

In order to overcome the problems described above, a liquid crystal drop fill device according to preferred embodiments of the present invention includes a stage which is arranged to support a substrate, a liquid crystal dispenser which is arranged to drop fill liquid crystal on the substrate supported by the stage, a first moving unit which is arranged to support the liquid crystal dispenser so as to be movable in a Y-direction (a moving direction of the liquid crystal dispenser when dispensing the liquid crystal) relative to the stage, and a second moving unit which is arranged to support the liquid crystal dispenser so as to be movable in an X-direction (a direction perpendicular to the moving direction of the liquid crystal dispenser when dispensing the liquid crystal) relative to the first moving unit, wherein the liquid crystal drop fill device further includes a third moving unit which is arranged to support the liquid crystal dispenser so as to be further movable in the Y-direction relative to the second moving unit.

In this case, it is preferable that the liquid crystal dispenser is attached to the second moving unit via the third moving unit.

In addition, a method for drop filling liquid crystal by the use of the liquid crystal drop fill device according to the preferred embodiment of the present invention includes the step of drop filling liquid crystal on a substrate on which a plurality of regions of different sizes in which the liquid crystal is to be drop filled are prepared by being surrounded by a sealing agent, wherein by the operation of the third moving unit, a pitch of the liquid crystal dispensed in the Y-direction by the liquid crystal dispenser including the third moving unit in any one of the regions in which the liquid crystal is to be drop filled is differentiated from a pitch of the liquid crystal dispensed in the Y-direction by another liquid crystal dispenser, which is placed above the stage in line with the liquid crystal dispenser including the third moving unit in the X-direction, in any one of the regions in which the liquid crystal is to be drop filled, the region being adjacent to said region.

According to the liquid crystal drop fill device having the above-described configuration which includes the first moving unit arranged to support the liquid crystal dispenser so as to be movable in the Y-direction relative to the stage and the second moving unit arranged to support the liquid crystal dispenser so as to be movable in the X-direction relative to the first moving unit, and further includes the third moving unit arranged to support the liquid crystal dispenser so as to be further movable in the Y-direction relative to the second moving unit, even if the liquid crystal dispenser is arranged to be moved at a 20-mm pitch in a dispensing direction of the liquid crystal dispenser by the first moving unit, the liquid crystal dispenser is controlled to be moved 5 mm at each dispensing in an opposite direction to the dispensing direction by the third moving unit, so that the pitch of the liquid crystal dispensed on the substrate can be changed to 15 mm.

In this case, if the liquid crystal drop fill device has a configuration such that the liquid crystal dispenser is attached to the second moving unit via the third moving unit, the liquid crystal drop fill device can be obtained easily and simply by adding the third moving unit to a conventional liquid crystal drop fill device.

In addition, according to the method for drop filling liquid crystal by the use of the liquid crystal drop fill device including the third moving unit, the method including the step of drop filling the liquid crystal on the substrate on which the plurality of regions of different sizes in which the liquid crystal is to be drop filled are prepared by being surrounded by the sealing agent, by the operation of the third moving unit, the pitch of the liquid crystal dispensed in the Y-direction by the liquid crystal dispenser including the third moving unit in the region in which the liquid crystal is to be drop filled can be differentiated from the pitch of the liquid crystal dispensed in the Y-direction by the different liquid crystal dispenser placed above the stage in line with the liquid crystal dispenser including the third moving unit in the X-direction in the region in which the liquid crystal is to be drop filled, the region being adjacent to the above-described region.

Therefore, even if the plurality of liquid crystal drop filled regions of different sizes are prepared on the mother glass, the pitches of the liquid crystal which is dispensed in the liquid crystal drop filled regions can be differentiated from each other, whereby appropriate drop filling of the liquid crystal in the liquid crystal drop filled regions can be achieved. Accordingly, the remainder of the mother glass can be reduced in size, which increases utilization efficiency of the mother glass.

DETAILED DESCRIPTION OF PREFERRED EMBODIMENTS

Figure 1:
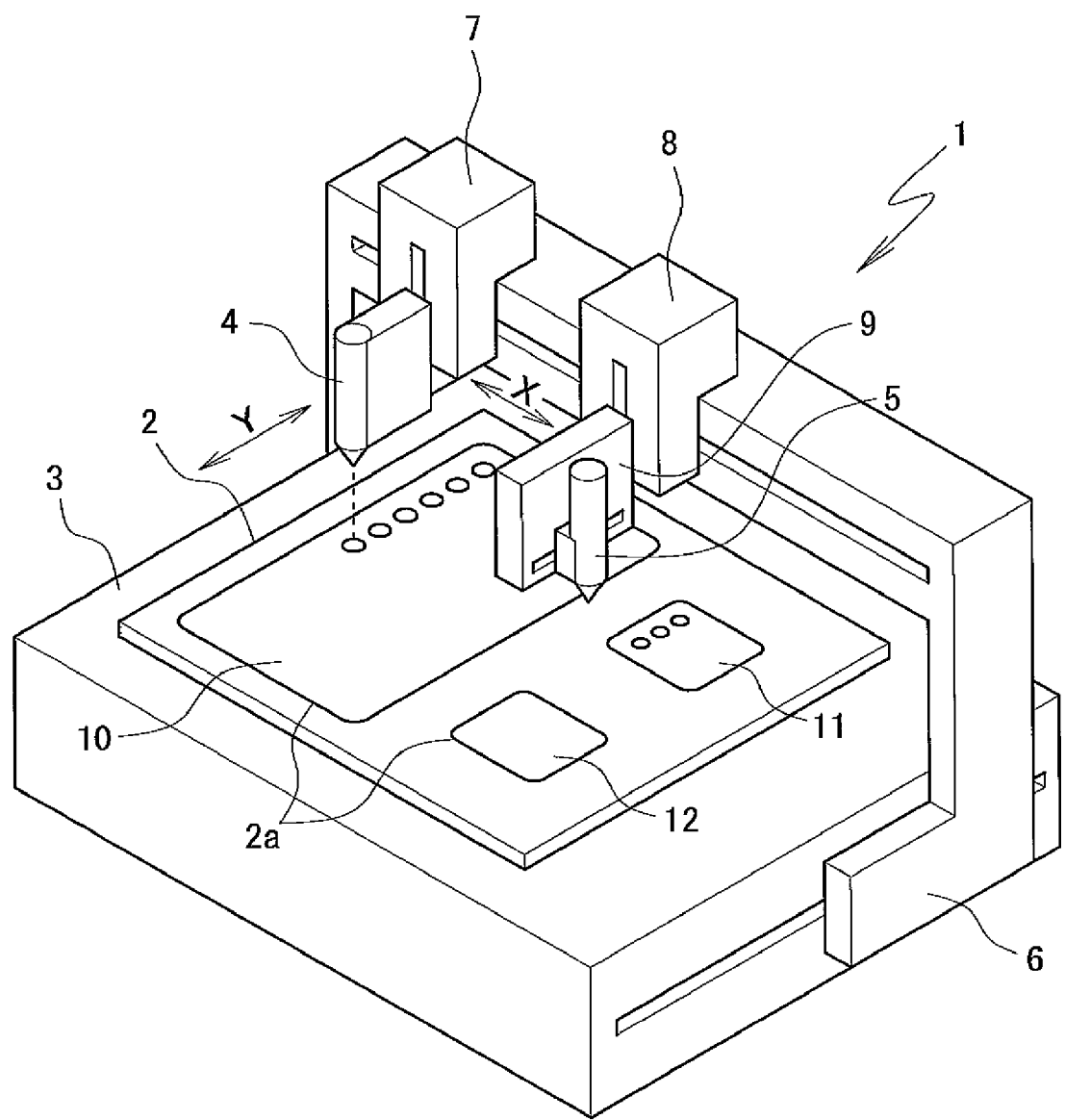
FIG. 1 is a view showing a schematic configuration of a liquid crystal drop fill device according to a preferred embodiment of the present invention.
Figure 2:
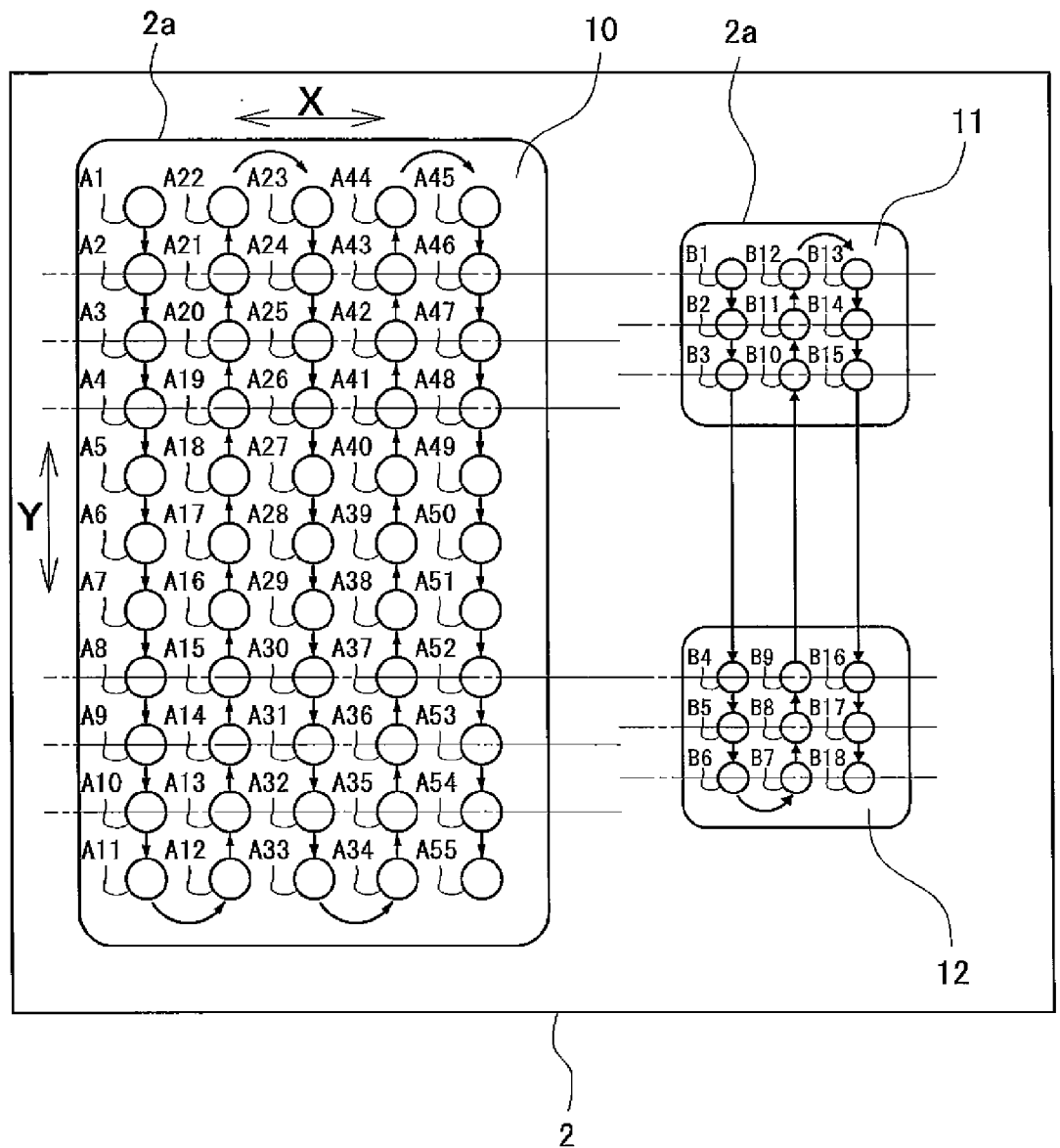
FIG. 2 is a view showing patterns of liquid crystal to be dispensed on a glass substrate by using the liquid crystal drop fill device shown in FIG. 1, and procedures for dispensing the liquid crystal.

A detailed description of a liquid crystal drop fill device and a method for drop filling liquid crystal by the use of the device according to preferred embodiments of the present invention will now be provided with reference to the accompanying drawings. FIG. 1 is a view showing a schematic configuration of a liquid crystal drop fill device according to a preferred embodiment of the present invention, and FIG. 2 is a view showing patterns of liquid crystal to be dispensed in two liquid crystal drop filled regions of different sizes, and procedures for dispensing the liquid crystal. Incidentally, as for a liquid crystal drop fill device 1 shown in FIG. 1, explanations of the same elements as those in the liquid crystal drop fill device 20 shown in FIG. 3 which are explained in the Description of the Related Art are omitted while providing the same reference numerals, and different respects are explained mainly.

Figure 3:
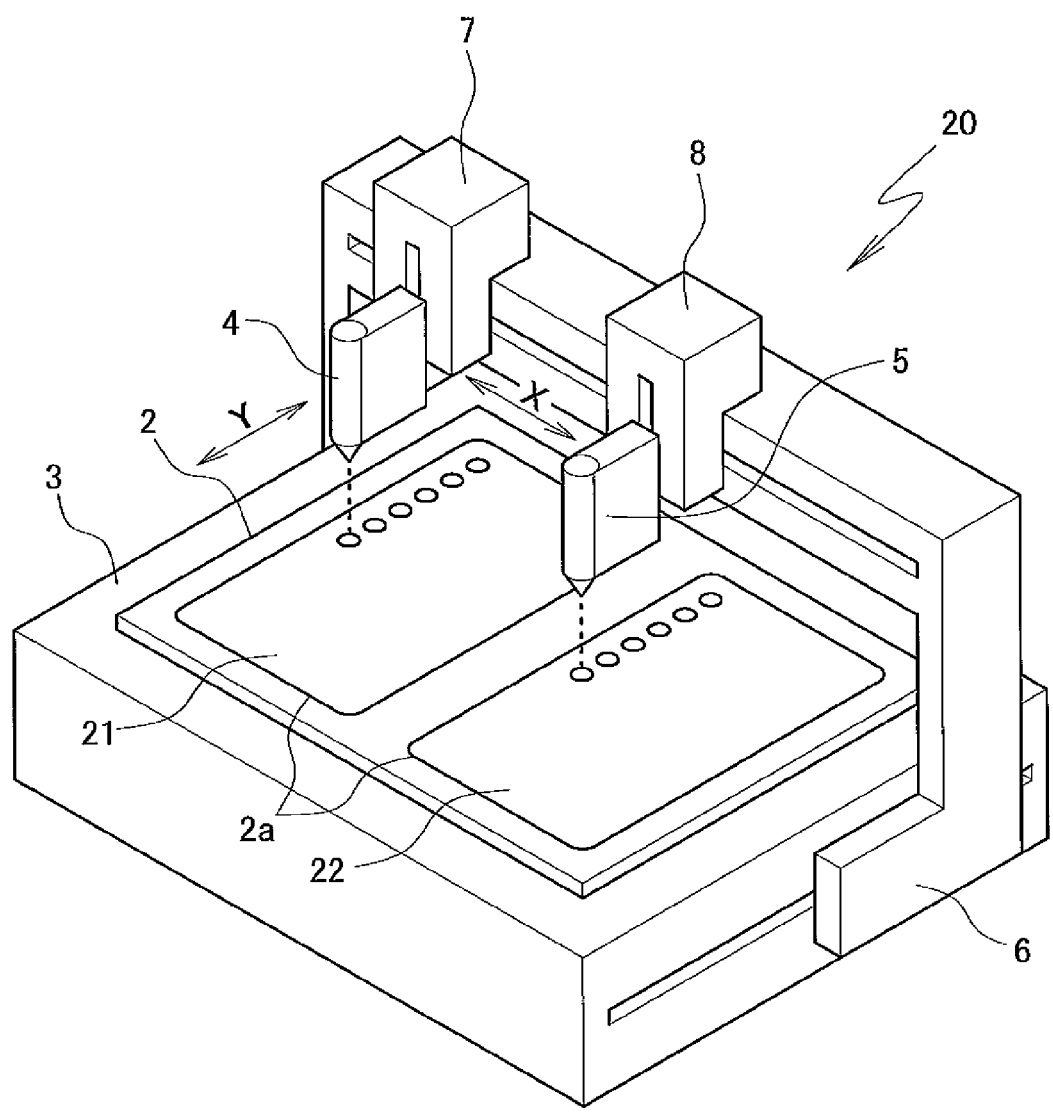
FIG. 3 is a view showing a schematic configuration of a conventional liquid crystal drop fill device.
Figure 4:
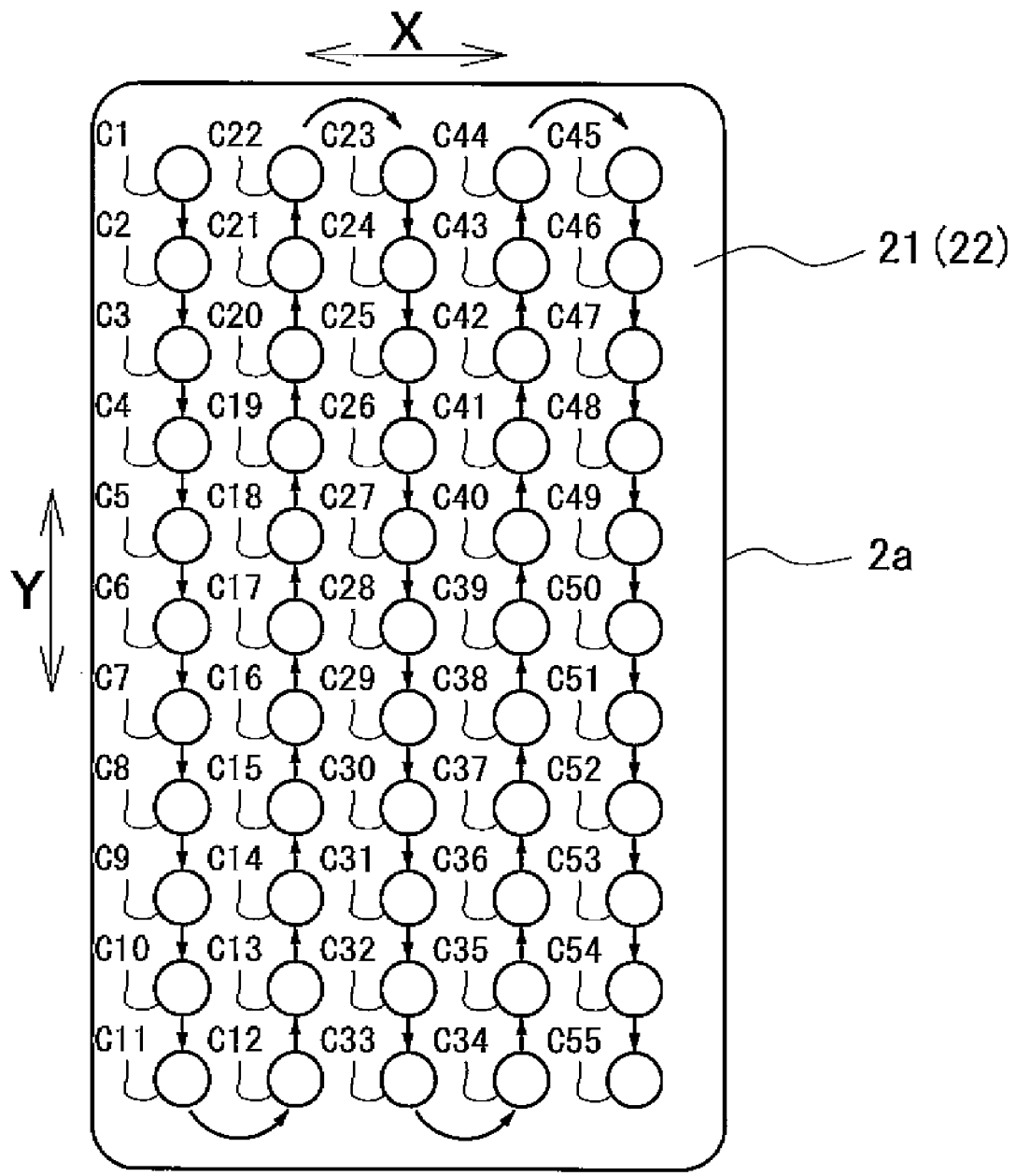
FIG. 4 is a view showing a pattern of liquid crystal to be dispensed on a glass substrate by using the liquid crystal drop fill device shown in FIG. 3, and procedures for dispensing the liquid crystal.

As shown in FIG. 1, the liquid crystal drop fill device 1 further includes a third moving unit 9 which is arranged to support the second liquid crystal dispenser 5 so as to be further movable in the Y-direction relative to the second moving unit 8, and the further inclusion of the third moving unit 9 differentiates the liquid crystal drop fill device 1 from the liquid crystal drop fill device 20 shown in FIG. 3. The operations of the third moving unit 9, the first moving unit 6 and the second moving unit 8 are controlled by the control system. That is to say, while the first liquid crystal dispenser 4 is moved in the Y-direction only by the first moving unit 6, the second liquid crystal dispenser 5 is moved in the Y-direction by the first moving unit 6 and the third moving unit 9. By having such a configuration, the liquid crystal drop fill device 1 is allowed to differentiate the pitch of the liquid crystal dispensed in the Y-direction by the second liquid crystal dispenser 5 including the third moving unit 9 from the pitch of the liquid crystal dispensed in the Y-direction by the first liquid crystal dispenser 4.

As shown in FIG. 2, on the glass substrate 2 which is supported by the stage 3, a first liquid crystal drop tilled region 10 and second liquid crystal drop filled regions 11 and 12 of different sizes in which liquid crystal is to be drop filled are prepared so as to have the shapes of rectangles surrounded by the sealing agent 2a. In this case, the second liquid crystal drop filled regions 11 and 12 are the same in size.

The pattern of liquid crystal to be drop filled in the first liquid crystal drop filled region 10 is arranged so that fifty-five positions at which the liquid crystal is to be dispensed are aligned starting from a position A1 so as to be in five rows at intervals of 20 mm rightward in an X-direction, and in eleven rows at intervals of 20 mm downward in the Y-direction. Meanwhile, the patterns of the liquid crystal to be drop filled in the second liquid crystal drop filled regions 11 and 12 are arranged so that nine positions at which the liquid crystal is to be dispensed are aligned respectively starting from a position B1 and a position B2 so as to be in three rows at intervals of 15 mm rightward in the X-direction, and in three rows at intervals of 15 mm downward in the Y-direction. A dispensing amount by the first liquid crystal dispenser 4 which is used for drop filling the liquid crystal in the first liquid crystal drop filled region 10 and a dispensing amount by the second liquid crystal dispenser 5 which is used for drop filling the liquid crystal in the second liquid crystal drop filled regions 11 and 12 are set in accordance with cell thicknesses of finished liquid crystal panels. The cell thicknesses are obtained by the following expression: the amount of one drop of liquid crystal to be dispensed×the number of the drops/the dimension of a liquid crystal drop filled region.

Simultaneous drop filling of the liquid crystal in the first liquid crystal drop filled region 10 and the second liquid crystal drop filled regions 11 and 12 which have the patterns different from each other as described above can be achieved by the use of the above-described liquid crystal drop fill device 1. A method for drop filling the liquid crystal by the use of the liquid crystal drop fill device 1 will be described in detail with reference to FIG. 1 and FIG. 2. First, the first liquid crystal dispenser 4 and the second liquid crystal dispenser 5 which are in line with each other in the X-direction are moved downward in the Y-direction by the first moving unit 6. When the first liquid crystal dispenser 4 is placed at a position above the position A1 in the first liquid crystal drop filled region 10, the liquid crystal is dispensed at the position A1. At this time, the second liquid crystal dispenser 5 does not dispense the liquid crystal.

Next, when the first liquid crystal dispenser 4 is moved 20 mm downward in the Y-direction by the first moving unit 6 and is placed at a position above a position A2, the liquid crystal is dispensed at the position A2. At this time, the second liquid crystal dispenser 5 is placed at a position above a position B1 in the second liquid crystal drop filled region 11, and the liquid crystal is dispensed at the position B1.

Next, while the first liquid crystal dispenser 4 is moved 20 mm downward in the Y-direction by the first moving unit 6 and dispenses the liquid crystal at a position A3, the second liquid crystal dispenser 5 is moved 20 mm downward in the Y-direction by the first moving unit 6 and 5 mm upward in the Y-direction by the third moving unit 9, the upward direction being opposite to the moving direction of the second liquid crystal dispenser 5 when dispensing the liquid crystal, and the liquid crystal is dispensed at a position B2 which is 15 mm downward from the position B1.

In a like manner, while the first liquid crystal dispenser 4 is moved 20 mm downward in the Y-direction by the first moving unit 6 and dispenses the liquid crystal at a position A4, the second liquid crystal dispenser 5 is moved 20 mm downward in the Y-direction by the first moving unit 6 and 5 mm further upward in the Y-direction (10 mm in total) by the third moving unit 9, and the liquid crystal is dispensed at a position B3 which is 15 mm downward from the position B2.

Then, while the first liquid crystal dispenser 4 is continuously moved by 20 mm downward in the Y-direction by the first moving unit 6 and dispenses the liquid crystal at positions A5, A6 and A7 in sequence, the second liquid crystal dispenser 5 does not dispense the liquid crystal and is moved 10 mm downward in the Y-direction by the third moving unit 9 so as to be in line with the first liquid crystal dispenser 4 in the X-direction.

When the first liquid crystal dispenser 4 dispenses the liquid crystal at positions A8, A9 and A10, the second liquid crystal dispenser 5 dispenses the liquid crystal at positions B4, B5 and B6 in the second liquid crystal drop filled region 12 in the same manner as dispensing the liquid crystal at the positions B1, B2 and B3 described above.

Next, while the first liquid crystal dispenser 4 dispenses the liquid crystal at a position A11, the second liquid crystal dispenser 5 does not dispense the liquid crystal. After that, the first liquid crystal dispenser 4 is moved 20 mm rightward in the X-direction by the second moving unit 7 and the second liquid crystal dispenser 5 is moved 15 mm rightward in the X-direction by the second moving unit 8. While the first liquid crystal dispenser 4 dispenses the liquid crystal at a position A12 when placed at a position above the position A12, the second liquid crystal dispenser 5 does not dispense the liquid crystal.

Then, the first liquid crystal dispenser 4 and the second liquid crystal dispenser 5 start to be moved upward in the Y-direction by the first moving unit 6. When the first liquid crystal dispenser 4 is placed at a position above a position A13, the liquid crystal is dispensed at the position A13. At this time, the second liquid crystal dispenser 5 is placed at a position above a position B7, and the liquid crystal is dispensed at the position B7.

When the first liquid crystal dispenser 4 dispenses the liquid crystal at positions A14 and A15, the second liquid crystal dispenser 5 dispenses the liquid crystal at positions B8 and B9 in sequence by being continuously moved by 5 mm downward in the Y-direction by the third moving unit 9. By the same procedures as above, the liquid crystal is continued to be dispensed. After dispensed at a position B18 in the second liquid crystal drop filled region 12, the liquid crystal is dispensed at a position A55 in the first liquid crystal drop filled region 10, and drop filling of the liquid crystal on the glass substrate 2 is completed.

According to the liquid crystal drop fill device and the method for drop filling liquid crystal by the use of the liquid crystal drop fill device according to the preferred embodiments of the present invention, even if the plurality of liquid crystal drop filled regions of different sizes are prepared on the mother glass and the patterns of the liquid crystal to be dispensed in the adjacent liquid crystal drop filled regions of different sizes are different, appropriate drop filling of the liquid crystal in the liquid crystal drop filling regions can be achieved. Accordingly, utilization efficiency of the mother glass can be increased. Incidentally, the present invention is not limited to the preferred embodiments, and modifications and variations are possible as long as they do not deviate from the principles of the present invention.

What is claimed is:

1. A liquid crystal drop fill device comprising:
   a stage which is arranged to support a substrate;
   a liquid crystal dispenser which is arranged to drop fill liquid crystal on the substrate supported by the stage;
   a first moving unit which is arranged to support the liquid crystal dispenser so as to be movable in a Y-direction of movement of the liquid crystal dispenser when dispensing the liquid crystal relative to the stage; and
   a second moving unit which is arranged to support the liquid crystal dispenser so as to be movable in an X-direction perpendicular to the moving direction of the liquid crystal dispenser when dispensing the liquid crystal relative to the first moving unit, wherein
   the liquid crystal drop fill device further comprises a third moving unit which is arranged to support the liquid crystal dispenser so as to be further movable in the Y-direction relative to the second moving unit.

2. The liquid crystal drop fill device according to claim 1, wherein the liquid crystal dispenser is attached to the second moving unit via the third moving unit.

3. A method for drop filling liquid crystal by the use of the liquid crystal drop fill device according to claim 1, the method comprising the step of drop filling liquid crystal on a substrate on which a plurality of regions of different sizes in which the liquid crystal is to be drop filled are prepared by being surrounded by a sealing agent, wherein by the operation of the third moving unit, a pitch of the liquid crystal dispensed in the Y-direction of movement of the liquid crystal dispenser when dispensing the liquid crystal by the liquid crystal dispenser including the third moving unit in any one of the regions in which the liquid crystal is to be drop filled is differentiated from a pitch of the liquid crystal dispensed in the Y-direction by another liquid crystal dispenser, which is placed above the stage in line with the liquid crystal dispenser including the third moving unit in the X-direction perpendicular to the moving direction of the liquid crystal dispenser when dispensing the liquid crystal, in any one of the regions in which the liquid crystal is to be drop filled, the region being adjacent to said region.

4. A method for drop filling liquid crystal by the use of the liquid crystal drop fill device according to claim 2, the method comprising the step of drop filling liquid crystal on a substrate on which a plurality of regions of different sizes in which the liquid crystal is to be drop filled are prepared by being surrounded by a sealing agent, wherein by the operation of the third moving unit, a pitch of the liquid crystal dispensed in the Y-direction of movement of the liquid crystal dispenser when dispensing the liquid crystal by the liquid crystal dispenser including the third moving unit in any one of the regions in which the liquid crystal is to be drop filled is differentiated from a pitch of the liquid crystal dispensed in the Y-direction by another liquid crystal dispenser, which is placed above the stage in line with the liquid crystal dispenser including the third moving unit in the X-direction perpendicular to the moving direction of the liquid crystal dispenser when dispensing the liquid crystal, in any one of the regions in which the liquid crystal is to be drop filled, the region being adjacent to said region.

* * * * *